(12) United States Patent
Hurwitz

(10) Patent No.: US 7,748,348 B2
(45) Date of Patent: Jul. 6, 2010

(54) COMPACT FOLDABLE ANIMAL LITTER PAN WITH DISPOSABLE ADHESIVE WASTE COLLECTION SHEETS

(75) Inventor: Marni Markell Hurwitz, Far Hills, NJ (US)

(73) Assignee: I Did It, Inc., Far Hills, NJ (US)

( * ) Notice: Subject to any disclaimer, the term of this patent is extended or adjusted under 35 U.S.C. 154(b) by 184 days.

(21) Appl. No.: 11/985,441

(22) Filed: Nov. 15, 2007

(65) Prior Publication Data

US 2008/0083376 A1    Apr. 10, 2008

Related U.S. Application Data

(63) Continuation-in-part of application No. 11/542,971, filed on Oct. 4, 2006.

(51) Int. Cl.
*A01K 1/035*    (2006.01)
(52) U.S. Cl. .................................. 119/168; 119/169
(58) Field of Classification Search ................ 119/161, 119/165, 168, 169
See application file for complete search history.

(56) References Cited

U.S. PATENT DOCUMENTS

| | | | | |
|---|---|---|---|---|
| 3,581,977 A | | 6/1971 | Kirsky et al. ................. 229/128 |
| 3,886,901 A | * | 6/1975 | Zeitter ........................ 119/168 |
| 3,890,930 A | | 6/1975 | Clark .......................... 119/169 |
| 4,047,499 A | * | 9/1977 | Janecek ....................... 119/168 |
| 4,062,817 A | | 12/1977 | Westerman ............... 525/330.2 |
| 4,076,663 A | | 2/1978 | Masuda et al. ............ 525/54.31 |
| 4,286,082 A | | 8/1981 | Tsubakimoto et al. ....... 526/240 |
| 4,333,461 A | | 6/1982 | Muller ........................ 604/368 |
| 4,340,706 A | | 7/1982 | Obayashi et al. ............. 526/207 |
| 4,360,021 A | | 11/1982 | Stima ......................... 604/365 |
| 4,699,619 A | | 10/1987 | Bernardin ................... 604/378 |
| 4,782,788 A | * | 11/1988 | Arcand ....................... 119/168 |
| 4,787,335 A | | 11/1988 | Carlyon ...................... 119/170 |
| 4,792,082 A | | 12/1988 | Williamson ................. 229/103 |
| 4,798,603 A | | 1/1989 | Meyer et al. ................. 604/378 |
| 4,800,841 A | * | 1/1989 | Yananton et al. ............ 119/168 |
| 4,801,006 A | * | 1/1989 | Martin et al. ................ 119/170 |
| 4,813,376 A | | 3/1989 | Kaufman et al. ............ 119/168 |
| 4,834,735 A | | 5/1989 | Alemany et al. ............ 604/368 |
| 4,884,527 A | | 12/1989 | Skirvin ....................... 119/168 |

(Continued)

*Primary Examiner*—Rob Swiatek
*Assistant Examiner*—Kristen C Hayes
(74) *Attorney, Agent, or Firm*—Ernest D. Buff + Associates, LLC; Ernest D. Buff; Margaret A. La Croix

(57) ABSTRACT

A collapsible animal litter pan has polymeric surfaces that are immune to urine soaking. A plurality of hinges collapse and expand the litter pan. The litter pan has sidewalls that locate, receive and stabilize a urine absorption sheet. The urine absorption sheet has a liquid impervious bottom layer, a urine absorption layer composed of cotton, cellulose fluff pulp, commuted pulp, soft wood fine chips, or hydrophilic paper and combinations thereof, together with superabsorbent polymers and a top, liquid permeable, layer. The top and bottom layers are bonded to constrain the urine absorbent layer. An adhesive coating is applied to the bottom layer of the urine absorption sheet for temporarily adhering the sheet to the foldable litter pan for enhanced stability of the urine absorption sheet. Animal urine is substantially completely absorbed by the urine absorbent sheet, and the soiled sheet replaced with a fresh sheet without soiling the litter pan.

21 Claims, 8 Drawing Sheets

U.S. PATENT DOCUMENTS

| | | | |
|---|---|---|---|
| 4,934,316 A * | 6/1990 | Mack | 119/169 |
| 4,940,016 A | 7/1990 | Heath | 119/168 |
| 5,014,649 A | 5/1991 | Taft | 119/168 |
| 5,035,205 A * | 7/1991 | Schiller et al. | 119/168 |
| 5,080,046 A * | 1/1992 | Cassone | 119/168 |
| 5,117,781 A | 6/1992 | Roach | 119/168 |
| 5,129,364 A | 7/1992 | Pirkle | 119/167 |
| 5,144,914 A * | 9/1992 | Giannakopoulos | 119/168 |
| 5,147,343 A | 9/1992 | Kellenberger | 604/368 |
| 5,149,335 A | 9/1992 | Kellenberger et al. | 604/372 |
| 5,167,205 A | 12/1992 | Bell et al. | 119/168 |
| 5,220,885 A * | 6/1993 | Goetz | 119/165 |
| 5,249,550 A | 10/1993 | Hines et al. | 119/168 |
| 5,337,700 A | 8/1994 | Toft | 119/168 |
| 5,394,834 A | 3/1995 | Queen et al. | 119/168 |
| 5,396,864 A | 3/1995 | Mannschreck | 119/174 |
| 5,465,686 A | 11/1995 | Monetti et al. | 119/168 |
| 5,572,951 A | 11/1996 | Evans et al. | 119/168 |
| 5,765,504 A | 6/1998 | Evans et al. | 119/168 |
| 5,845,601 A * | 12/1998 | Robinson | 119/168 |
| 5,913,282 A | 6/1999 | Indes et al. | 119/168 |
| 6,382,131 B1 * | 5/2002 | McGivern | 119/165 |
| 6,698,382 B1 | 3/2004 | Blaszak et al. | 119/168 |
| 6,802,281 B2 * | 10/2004 | Otsuji et al. | 119/169 |
| 6,938,639 B1 * | 9/2005 | Robinson | 137/312 |
| 7,249,570 B1 * | 7/2007 | Roberson | 119/169 |
| 2002/0056418 A1 * | 5/2002 | Fleming et al. | 119/28.5 |
| 2006/0200105 A1 | 9/2006 | Takahashi et al. | 604/360 |

\* cited by examiner

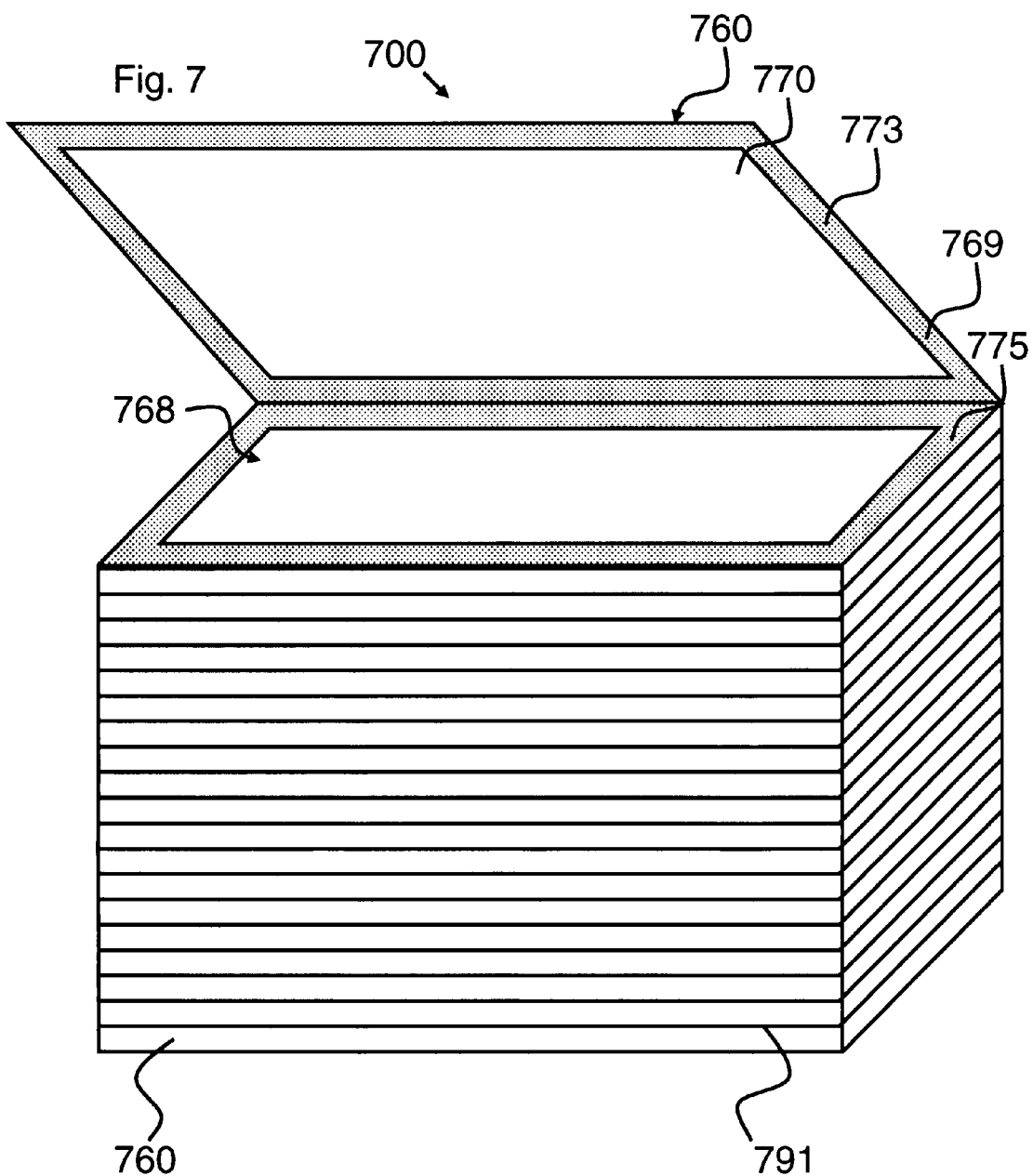

COMPACT FOLDABLE ANIMAL LITTER PAN WITH DISPOSABLE ADHESIVE WASTE COLLECTION SHEETS

CROSS-REFERENCE TO RELATED APPLICATIONS

This application is a continuation-in-part of U.S. patent application Ser. No. 11/542,971, filed Oct. 4, 2006, the disclosure of which is hereby incorporated in its entirety by reference.

BACKGROUND OF THE INVENTION

1. Field of the Invention

The present invention relates to animal litter pans with disposable adhesive waste collection sheets; and, more particularly, to an animal litter pan that is converted from a foldable, collapsed condition to an unfolded condition operative to receive an insertable waste collection packet/sheet having an adhesive coating that removably adheres to the pan in a stabile stationary manner and absorbs animal urine while retaining solid waste for easy disposal.

2. Description of the Prior Art

A number of animal waste litter boxes of varying sizes and shapes have been described by prior art workers. The litter boxes have sidewalls high enough to contain and prevent dispersal of cat or animal litter when an animal uses the litter box. Clumping cat litters use compositions that react with urine to form a hardened clump. These clumps tend to become attached to the litter box, causing it to require periodic cleaning. Non-clumping cat litter also adheres to plastic or cardboard litter boxes. Consequently, these litter boxes have to be periodically cleaned by the pet owner or discarded. Absorbers are known in the industry for absorbing urine. Super absorbers of cross-linked polysaccharide are commonly found in diapers or incontinence napkins. However, these absorbers have not been used in pet litter boxes.

U.S. Pat. No. 3,581,977 to Kirsky et al. discloses litter boxes. These litter boxes are designed to provide a container with a unique closure. The closure consists of a lid, several wings and a front panel. The components are hinged together along score lines and perforated lines. Because of the angles at which they are folded, certain wing panels tend to distort during the closing process thereby holding the lid in place when the lid is in the completely closed position. This cardboard litter box is collapsed with cat litter and is thrown away. The litter box does not have a urine impervious plastic surface. It uses cat litter, and the box is provided with elevated sides to contain the spillage of cat litter. The litter box does not use a urine absorption sheet having an adhesive backing.

U.S. Pat. No. 3,890,930 to Clark discloses an animal commode. This animal commode includes a polymeric inner container capable of receiving an animal and carrying a removable thermoplastic sheet lining, which can be replaced from time to time. A thermoplastic lined outer structure receives the inner container. The outer structure extends beneath and around the inner container. It has an upper portion extending over the top of the inner container. At least one end has an opening through which an animal will have free access into and out of the inner container. The upper portion of the outer structure normally covers and blocks the interior of the inner container from view, particularly from above. At the same time this upper portion of the outer structure is movable with respect to the remainder thereof to and from a normal position covering the inner container. Thus when the upper portion of the outer structure is moved away from this normal position the inner container is freely accessible so as to enable the lining to be easily removed and replaced. The liner is filled with particulate cat litter and does not use a urine absorption sheet having an adhesive backing. The inner liner has side edges within the outer structure that prevent spreading the particulate cat litter.

U.S. Pat. No. 4,787,335 to Carlyon discloses a litter box. This pet litter box consists of a wooden or plastic rectangular box having a superstructure 'A-frame' in combination with a disposal bag. The disposal bag covers the entire box and the A-frame. The box is constructed with a relatively low peripheral sidewall. The A-frame structure consists of side struts that suspend a center rod centrally over the box. A polymeric disposal bag of selected size and configuration is then secured over the box and the A-frame while allowing access through one end. The used cat litter is emptied into the bag by rotating the rectangular box and removing the struts of the A frame. A litter additive or absorbent material, deodorizer and such is placed in the sheet of the disposal bag. The pet may enter through the front side of the litter box and perform its litter function. This litter box uses conventional cat litter, which is prevented from spillage by the sidewalls of the litter box. No disclosure is contained concerning use of a urine absorption sheet having an adhesive backing.

U.S. Pat. No. 4,792,082 to Williamson discloses an enclosed animal litter box. This litter box includes an outer front sidewall, an outer rear sidewall, an outer left sidewall, a cover member, and an outer right sidewall. The litter box is formed from a single integral cardboard sheet which, when folded, results in an enclosed, disposable litter box. The box may be shipped with a supply of litter enclosed, and may be shipped and stored in a rectangular package having a height of approximately 2 inches. The cardboard does not provide a plastic surface. It uses conventional cat litter in the bottom tray of the litter box produced by folding portions of the single integral cardboard sheet. The sides of the bottom portion of the litter box prevent spilling of the cat litter. The litter box does not use a urine absorption sheet having an adhesive backing.

U.S. Pat. No. 4,813,376 to Kaufman et al. discloses a cat litter tray. This portable cat litter tray is easily converted from a closed box to an open tray. The plastic or cardboard litter tray comprises a structure that is movable between the closed box position and the open tray position. A bag is secured to the sidewalls of the cat litter tray by a pair of U shaped clips. The bag covers the bottom of the tray and receives the cat litter. When the cat litter is exhausted, the user closes the bag and secures it with a tie for disposal. The sheet material of the bag is not disclosed; but appears from to the drawings to be composed of plastic. The cat litter tray uses conventional cat litter. The raised sidewalls of the tray prevent spillage of the contained cat litter. This cat litter tray does not use a urine absorption sheet having an adhesive backing.

U.S. Pat. No. 4,884,527 to Skirvin discloses a self-contained disposable animal commode. This self-contained disposable animal commode has a container with an access opening. The container includes a base portion defining a box-like receptacle having an open top for receiving a pan and a cover portion cooperating with the base portion to define a substantially entirely enclosed space. The base portion of the container is adapted to support an animal for defecation and urination into a loose material. The cover portion of the container is movable from a collapsed position, which substantially conforms to the base portion, to an expanded position. The container thus defines a substantially entirely enclosed space, with the loose cat litter contained within the base portion and the cover portion being collapsed during shipping and expanded for use. Additionally, the expanded position causes the cover portion to be positioned to comfortably receive the animal with the access opening being positioned for ingress and egress of the animal. The cover portion has a plastic inner surface. It functions as a bag and is collapsed for disposal with the base and the pan containing used cat litter. The base plate and pan contains conventional loose cat litter and the sidewalls and the cover prevent loose litter spillage. This disposable animal commode does not use a urine absorption sheet having an adhesive backing.

U.S. Pat. No. 4,940,016 to Heath discloses a unitary collapsible and disposable pet litter container. This disposable pet litter reinforced cardboard container is foldable between a collapsed state for storage and disposal, and an erect state for use. The container includes a lower box portion defining a litter-containing receptacle, which is plastic lined to reduce liquid soak through. The lower box portion includes a bottom, peripheral wall member extending upwardly from the bottom to form the litter-containing receptacle therewith. A foldable top covers the lower box portion in the collapsed state. An upper box portion is provided and is selectively extendable from the lower box portion. The upper box portion includes front and rear panels extending upwardly from one pair of oppositely disposed wall members of the lower box portion. These front and rear panels are adapted for selectively folding into the lower box portion for storage when in its collapsed state. A pair of side panels project upwardly from a second pair of oppositely disposed peripheral wall members, and are adapted to form the top when in its collapsed state. The side panels include a mechanism for interlocking with the front and rear panels to selectively maintain the container in its erect state, and further include top flap members adapted for overlapping engagement when in its erect state to form a top surface for the container and to totally enclose the container. Finally, the front panel has an entry to and from the interior of the enclosed, erect container. The unitary pet litter container is completely enclosed preventing spillage of conventional pet litter. This unitary pet litter container does not use urine absorption sheet having an adhesive backing.

U.S. Pat. No. 5,014,649 to Taft discloses a cat litter box with integral, collapsible enclosure. This is a pasteboard cat litter structure comprising a shallow, rectangular, plastic-lined, box-like base adapted for holding a quantity of cat litter. Attached to the top of the base is a collapsible enclosure shaped like a house. The enclosure comprises first and second opposite end panels, which fold downwardly and inwardly along a lower crease line to lie flat atop the base when the enclosure is collapsed. The enclosure further comprises a continuous, central portion made up of first and second side panels and an enclosure roof. The central portion is constructed having two opposing, longitudinal, side creases and a roof crest crease, which permit the central portion to be folded down, bellows-style, on top of the folded-down end panels. A flat, substantially closed structure, about the height of the base is then formed. A lid, similar in shape to the base is provided for covering the folded-down enclosure and base, the base fitting downwardly into the lid when the enclosure is erected. A partial cut-out in one side panel hinges outwardly or inwardly about a vertical crease to form an entrance into the enclosure when the enclosure is erected. The cat litter structure can be re-used or the enclosure can be collapsed and the lid installed so the entire structure can be disposed of with used litter inside. The upper hose-like portion of the cat litter box collapses on the tray containing cat litter for disposal. The cat litter box contains conventional cat litter. The sides of the litter box, together with the collapsible hosing, prevent cat litter spillage. The cat litter box does not use urine absorption sheet having an adhesive backing.

U.S. Pat. No. 5,117,781 to Roach discloses a cat litter disposable box container. This rectangular box container is utilized for the deposition, temporary storage and disposal of pet cat excrement. The box container is pre-loaded with absorbent granular litter material and prior to use is shipped and stored in a compact rectangular state, approximately thirteen inches wide, twenty one inches long and three inches tall. The box unfolds to erect a larger rectangular box chamber, approximately thirteen inches wide, twenty one inches long and thirteen inches tall. The rectangular box chamber, in its erected state, provides an opening through which a cat may enter the box to gain access to the pre-loaded absorbent granular litter material inside the box and, after use, exit the box. The container may be used in this erected state to its useful capacity, after which the container is folded down for compact disposal. This disposable box is made from cardboard and is treated with wax to resist liquid leakage. It uses prepackaged conventional cat litter and its spillage is prevented by the enclosed construction of the disposable box. This cat litter disposable box container does not use a urine absorption sheet having an adhesive backing.

U.S. Pat. No. 5,129,364 to Pirkle discloses a one-piece disposable cat litter box. This disposable cat litter box is entirely made of a single piece of cardboard. The litter box has a lower portion to hold cat litter and an expandable upper portion, which completely encloses the cat litter except for providing an opening for ingress and egress of the cat. The lower portion has one or more removable mesh-type litter bag linings that allow removal of cat feces without removing the cat litter. A charcoal filter can be provided to control odors. This cat litter box is made from cardboard surface of which is not protected by a polymeric surface. The cat litter box uses conventional cat litter and does not use urine absorption sheet having an adhesive backing.

U.S. Pat. No. 5,167,205 to Bell et al. discloses a convertible disposable animal litter container. This disposable animal litter box can be folded into a compact form for storage, shipment, and/or disposal. The pet litter container includes a base made from a first piece of sheet material and an insert made from a second piece of sheet material. The base includes a bottom portion for containing the pet litter, a pair of foldable side panels attached to the bottom portion, and a pair of roof panels attached to the side panels. The insert includes a floor panel, which is disposed inside the bottom portion of the base, and a pair of foldable end walls. Together, the base and the insert form an enclosure containing the pet litter. The base and insert are made from cardboard or other biodegradable foldable material. The cardboard is not protected by a polymeric surface from becoming soaked with urine. The litter container uses conventional cat litter and the insert has deflector flaps around a portion of the end panel, preventing escape of cat litter. The litter container does not use a urine absorption sheet having an adhesive backing.

U.S. Pat. No. 5,249,550 to Hines et al. discloses a convertible disposable litter box. This disposable litter box is defined by a foldable closed container and includes a supply of litter. The box is adapted to be unfolded into a unitary litter box having a continuous outer perimeter of even height that defines an open topped litter box for use by pets and the like. After use is completed, the box may be refolded to confine the soiled litter, which may then be readily disposed of. Visual indicators are provided to facilitate closing the box. The litter box is made from cardboard or other biodegradable material and is not protected from urine by a polymeric surface. The litter storage is contained within the box and cat litter is distributed throughout the bottom of the box for pet use. This litter box uses conventional cat litter and does not use a urine absorption sheet having an adhesive backing.

U.S. Pat. No. 5,337,700 to Toft discloses a foldable, disposable kitty litter container. This foldable, disposable, kitty liter container has an outside enclosure, a bottom disposable litter tray and a roof top. The outside enclosure fits snugly over the bottom litter tray, and the bottom litter tray is disposable after several uses. The outside enclosure is made from a water resistant, odor absorbing material. It is re-useable for several bottom litter trays. The enclosure has four indentations, one in each of the four top corners. These indentations are pushed inward to form a support for the separate roof top pieces of the container. Also, four pointed corner structures, at the top of the enclosure provide scratching and playing objects for the cat. The bottom litter tray contains a unique system of tabs, slots, and creases to fold and lock the tray in a folded position. The tabs are pre-formed, and the slots are pre-cut into the material. The tabs are inserted into the slots to lock the bottom tray in the folded position. The bottom litter tray contains conventional cat litter and is snuggly fitted in an outside enclosure that prevents spillage of cat litter. The bottom tray is discarded after use. It is not protected by a plastic surface that prevents absorption of urine. The kitty liter container does not use a urine absorption sheet having an adhesive backing.

U.S. Pat. No. 5,394,834 to Queen et al. discloses a foldable, disposable pet toiletry system. This disposable pet utility system provides prepackaged absorbent cat litter of a pre-measured quantity for household pet care. It includes a container having creases at each of its corners for collapsing the container about its contents during shipment and disposal. The package is erected for pet use by peeling the top portion to expose the cat litter. After the contents of the container have been used up, the two sections of the top wall are resealed and the container is collapsed so as to allow a compact and sanitary method of disposal. The container is made from heavy-duty Kraft paper or other biodegradable material including fiberboard, cardboard, molded cellulose, paper stick, wood or particle board. The pet toilet container is not composed of a plastic surface material. It is intended for single use only. The pet toilet uses prepackaged conventional litter, and the height of the sidewalls prevents the cat litter from being spilled. The pet toilet does not use urine absorption sheet having an adhesive backing.

U.S. Pat. No. 5,396,864 to Mannschreck discloses a method for disposing of animal wastes. This method for disposing of animal excrement uses a container having a bottom wall, a front wall, a rear wall, a first sidewall and a second sidewall. Each of the front wall, the rear wall and the first and the second sidewalls is connected to the bottom wall, and cooperates with the bottom wall to encompass a pet receiving space in an opened position of the container in which litter material is placed. The ends of the sidewalls and the front and rear walls, opposite the ends connected to the bottom wall, are connected. The sidewalls are gusseted so that the container may be collapsed to a position wherein the sidewalls and the front and rear walls are folded onto the bottom wall in the collapsed position of the container. The container is opened from the collapsed position to an operating position wherein the sidewalls and the front and rear walls each extend a distance upwardly from the bottom wall and cooperate to enclose the pet receiving space. A pet opening is formed through the front wall of the container. The pet opening is sized so that a pet can enter into the pet receiving space via the pet opening. After use by the pet, the container is collapsed and disposed of. The pet litter housing made up of Kraft paper or polypropylene has a litter bag enclosing a quantity of pet litter. This collapsible pet litter dispensing method uses conventional cat litter and does not use a urine absorption sheet having an adhesive backing.

U.S. Pat. No. 5,465,686 to Monetti et al. discloses a collapsible house for pets. This disposable, collapsible pet house is of foldable form prepared from a unitary blank of material that is received in a flat state. The house is foldable from the blank between a collapsed state for shipping, storage and disposal and an enclosed, erect state for use. The house comprises a container portion having a bottom, a pair of oppositely opposed sidewalls extending upwardly from and integral with the bottom, and a pair of oppositely opposed end walls extending upwardly from and integral with the bottom. The pair of end walls is connected to the pair of sidewalls. At least one of the pair of end wall panels has an opening for ingress and egress of a pet when the house is in the erect state. A pair of roof panels, each integral with one of the pair of sidewall panels, in the erect state, is provided. The disposable pet house is enclosed to prevent spillage of litter during its use and may alternatively be used as an animal playhouse enclosing a pet bedding. The disposable pert house is made from cardboard and does not have a plastic surface. It uses a conventional pet litter; and the pet house with the used litter is collapsed and discarded. The pet house does not use a urine absorption sheet having an adhesive backing.

U.S. Pat. Nos. 5,572,951 and 5,765,504 to Evans et al. disclose a collapsible animal box. This collapsible animal box can be conveniently shipped, marketed and discarded in collapsed form. The box is made from a single foldable sheet of carton stock, paperboard, solid fiberboard, foldable plastics, vinyls and acetates. The box may contain animal litter and an animal litter container. Preferably, the animal box is constructed from a single cut and scored blank of foldable material. The assembled, fully extended animal box encloses a space sufficiently large to accommodate an animal litter container and at least one animal, and includes a door positioned to permit entry and egress by the animal. The bottom of the animal box enclosure is filled with conventional cat litter. The collapsible animal box does not use a urine absorption sheet having an adhesive backing.

U.S. Pat. No. 5,913,282 to Indes et al. discloses a pet litter box. This device is useful as a disposable litter box and comprises a base flexibly attached to a cover and constructed from a single piece of biodegradable, lightweight construction material that either is, or is treated to be, moisture resistant. The collapsible, disposable pet litter box has a cover flexibly attached to a base. The device is capable of being manipulated, into an erect state that allows access to the litter material held within the base. When the pet litter box is in a collapsed state the cover caps the base and seals litter within the base. This pet litter box uses conventional cat litter and the sides of the bottom base as well as the cover prevent spillage of the cat litter. The pet litter box does not use a urine absorption sheet having an adhesive backing.

U.S. Pat. No. 6,698,382 to Blaszak, et al. discloses a collapsible container. This cardboard collapsible container has three generally rectangular panels each of which has opposed parallel side edges and opposed parallel end edges. The side edges of each panel are secured by hinges to one side edge of each of the other panels. Additionally, one of the panels includes a fold line extending midway between and parallel to the side edges of that panel thus dividing that panel into two subpanels. The panels are movable between an open and a closed position. In their open position, the panels form a triangular shaped structure whereas in their collapsed position, the panels and subpanels lie in closely adjacent and generally parallel planes to each other. Optionally, the triangular structure can contain cat litter on its interior. The cat litter is discharged without contact with the user by collapsing the container. This cardboard collapsible container is not plastic coated. It has elevated side edges to retain the cat litter that is used. This collapsible container litter box does not use an absorber sheet having an adhesive backing.

Absorbent composites suitable for use in disposable absorbent garments such as diapers, adult incontinent products, and the like, are known. Such absorbent composites are described, for example, in U.S. Pat. No. 4,699,619 to Bernardin; U.S. Pat. No. 4,798,603 to Meyer et al.; U.S. Pat. No. 4,834,735 to Alemany et al.; U.S. Pat. No. 5,147,343 to Kellenberger; and U.S. Pat. No. 5,149,335 to Kellenberger et al.

Generally, such absorbent composites comprise a means of containing a high-absorbency material and a high-absorbency material. Suitable means for containing the high-absorbency material include fibrous matrixes, such as those formed from air-laid cellulosic fibers or a coform material comprising cellulosic fibers and meltblown polyolefin fibers. A wide variety of high-absorbency materials (also known as superabsorbent materials) are known to those skilled in the art. See, for example, U.S. Pat. No. 4,076,663 to Masuda et al.; U.S. Pat. No. 4,286,082 to Tsubakimoto et al.; U.S. Pat. No. 4,062,817 to Westerman; and U.S. Pat. No. 4,340,706 to Obayashi et al.

U.S. Pat. No. 4,333,461 to Muller discloses borated polysaccharide absorbents and absorbent products. Guar gum as an exemplification of cis-1,2-diol polysaccharides is first hydrated then thickened by cross-linking with borax and finally dried to powder or flake form, preferably by freeze drying. The resulting particles can absorb up to 100 times their weight or more of aqueous fluids such as urine. Absorbent articles, such as disposable diapers, bandages, and the like are formed with the borax-cross-linked guar gum as absorbent. In a preferred diaper the dry absorbent particles of the borax cross-liked guar gum are placed in the cells of a cellular or bubble-type substrate. This is a superabsorbing polymer, and the '461 patent does not disclose its use in a collapsible pet litter box.

U.S. Pat. No. 4,360,021 to Stima discloses an absorbent article. This absorbent article comprises a cover sheet and a backing sheet, the cover and backing sheets being attached in areas without the use of water-insoluble adhesives to form pockets in which a fluid absorbent material is stored. The absorbent article is formed by depositing portions of the fluid absorbent material on the backing sheet, placing the cover sheet over the absorbent material and the backing sheet, and pressing the cover sheet towards the exposed parts of the backing sheet to cause bonding of the fibers in each sheet and attaching the cover sheet to the backing sheet to form pockets in which the absorbent material is stored. The absorbent material comprises a mixture of (a) a derivatized or underivatized cis-1,2-diol polysaccharide, boric acid and an alkali material or (b) a borate cross-linked guar gum and alkali. This absorbent article is not indicated to be incorporated in a collapsible pet litter box.

U.S. Patent Application 20060200105 to Takahashi, et al. discloses a pet waste absorption sheet and process for manufacturing the same. This pet waste absorption sheet includes: a liquid-impermeable backsheet; a liquid-permeable topsheet; and an absorbent core disposed between the backsheet and the topsheet. The topsheet has a chemical solution containing at least one component selected from the group consisting of perfume, deodorant, and sterilant. The absorbent core may comprise an absorbent material layer constructed by mixing superabsorbent polymer (SAP) in fluff pulp (or comminuted pulp). The superabsorbent polymer (SAP) is distributed over the upper surface of the absorbent material layer, and hydrophilic papers are wrapped around the absorbent material layer and the superabsorbent polymer. In the absorbent core, the hydrophilic paper covers the lower surface and side surfaces along the long sides, and the hydrophilic paper covers the upper surface. This pet waste absorption sheet is not incorporated in a collapsible pet litter box and does not have an adhesive coating for removable securement thereto.

Notwithstanding the efforts of prior art workers to construct a pet litter box that collapses to a small size and is easily transported, there remains a need in the art for a lightweight, inexpensive pet litter box that collapses quickly to a very small size, is readily opened to an expanded size that accommodates pet use, and does not generate the mess typically associated with pet litter spills. Also needed in the art is a pet litter box, the sides of which have a minimal height that enables a pet to easily enter the use area and leave without spilling pet litter or waste and to retain a replaceable urine absorption sheet/insertable waste collection packet. Additionally needed in the art is a urine absorption sheet appointed for replacement use in a pet litter box that includes an adhesive coating for securing the sheet in a litter box and for maintaining the integrity of the sheet so that is remains stationary during use.

SUMMARY OF THE INVENTION

The present invention provides a collapsible animal litter pan with shallow sides that enable a pet to enter the use area and leave without pet litter spillage. In its collapsed state, the litter pan has a length in the range of 9 to 30 inches, preferably 12 inches. The width of the litter pan in the collapsed condition is in the range of 4 to 10 inches, and preferably about 5 inches. The litter pan has three folding locations connecting four segments. When the litter pan is expanded, a 12 inch long, 5 inch wide litter pan becomes approximately 20 inches long by 12 inches wide. The sidewalls of the expanded pan are approximately one to two inches wide and the height of the sidewall above the bottom of the litter pan is only approximately 0.25 to 0.375 inches, allowing the pet to easily enter and exit the litter pan.

The pan portion of the litter pan is adapted to receive a urine absorption sheet dimensioned to match the litter pan dimensions between the sidewalls thereof, when the pan is in the expanded condition. This dimension is typically 18 inches by 10 inches for a 20 inch long 12 inch wide pan that has 1 inch sidewalls. The urine absorption sheets include an adhesive coating for securing the sheet in the pan and for maintaining the integrity of the sheet so that is remains stationary during use.

The folded sheets of the urine absorption pad and the collapsed litter pan are similarly dimensioned so that they may be packaged together. The user expands the collapsible litter pan, and unfolds the sheet intended to be utilized. Upon which time the user inserts the urine absorption sheet in the recess between the sidewalls of the litter pan and presses on the sheet to cause the adhesive coating to bond to the pan, whereupon the litter pan is ready for use. When the pet uses the litter pan, the urine is completely absorbed within the urine absorption sheet, while solid feces remain on top of the sheet. Due to the adhesive coating of the sheet, movement and shifting of the sheet is mitigated despite forces applied to it from traffic of the animal. Although the urine absorption sheet is adequate for absorbing a number or urine excretions, the user may choose discard the urine absorption sheet frequently, and peel the soiled sheet from the pan and replace it with a new urine absorption sheet. The construction of the urine absorption sheet has an impervious under layer, as described below, preventing seepage of urine. Adhesive located on the bottom of the urine absorption sheet mitigates shifting of the sheet and therefore minimizes risk of transfer of waste from the sheet to the pan. Moreover, the plastic surface of the collapsible litter pan prevents soaking thereof with urine. With this construction, the litter pan can accommodate use of several urine absorption sheets, one at a time, and the sheets remain in a virtually stationary manner while located in the tray/pan. The adhesive is a weakly bonding adhesive coating that facilitates easy removal of the sheet from the tray, yet strong enough to provide adequate securement of the sheet in the pan during use.

The collapsible litter pan, having a polymeric surface, may be manufactured from molded or extruded plastic, including polyethylene, polypropylene, polyvinylchloride or other polymers. Alternatively, the collapsible litter pan may be constructed from cardboard or Kraft paper having the outer surface completely covered with a bonded polymeric sheet such as polyethylene, polypropylene or polyvinylchloride. The fold lines of the collapsible litter pan may be taped with an adhesive coated polymeric tape to improve hinge action and reduce the possibility of any urine leakage.

The urine absorption sheet has a bottom layer that is impervious to urine and is typically made from polyethylene, polypropylene, polyvinylchloride or other suitable polymeric sheet. Under the bottom layer is an adhesive coating, which may coat substantially the entire bottom layer, or just a portion of the bottom layer. This adhesive coating bonds to the tray/litter pan so that the sheet remains substantially stationary during use. Upon soiling of the sheet, the sheet is peeled off of the tray with ease, and discarded. A new sheet is then applied to the tray and adhered thereto for use. A urine absorption layer is provided on the impervious layer of the sheet. Moreover, a top urine permeable layer is provided over the urine absorption layer. The bottom layer and the top layer are bonded by stitching, glue bonding, hot polymeric melt attachment or any other suitable bonding method. With this construction, the urine absorption layer is trapped between the impervious bottom layer and the urine permeable porous layer, preventing spillage of urine absorbing materials entrained therewithin.

The urine absorption layer is present on the top impervious sheet layer, and may comprise cotton, cellulose fluff pulp, commuted pulp, soft wood fine chips, hydrophilic paper and combinations thereof. In a preferred embodiment, the urine absorption layer additionally includes super absorption polymers (SAP) such as borated polysaccharides, which absorb 100 times their weight of moisture including animal urine. Other known organic high-absorbency materials can include natural materials, such as agar, pectin, guar gum and peat moss, as well as synthetic materials, such as synthetic hydrogel polymers. Such hydrogel polymers include, for example, carboxymethylcellulose, alkali metal salts of polyacrylic acids, polyacrylamides, polyvinyl alcohol, ethylene maleic anhydride copolymers, polyvinyl ethers, hydroxypropyl cellulose, polyvinyl morpholinone, polymers and copolymers of vinyl sulfonic acid, polyacrylates, polyacrylamides, polyvinyl pyridine and the like. Other suitable polymers include hydrolyzed acrylonitrile grafted starch, acrylic acid grafted starch, and isobutylene maleic anhydride copolymers, and mixtures thereof. The hydrogel polymers are preferably lightly cross-linked to render the materials substantially water-insoluble. Cross-linking may, for example, be by irradiation or by covalent, ionic, Van der Waals, or hydrogen bonding. Suitable materials are available from various commercial vendors, such as Dow Chemical Company., Celanese Corporation, Allied-Colloid, and Stockhausen. The superabsorbers are entrained or wrapped within cotton, cellulose fluff pulp, commuted pulp, soft wood fine chips, hydrophilic paper or cellulose fibers.

This urine absorption layer is covered with a urine permeable layer such as a porous body which may be a sheet or woven or non-woven fabric made from cotton, nylon, or other fibers. The cell size of the pores are sufficient to allow free entry of urine yet not large enough to allow entry of the nails of the cat allowing to cat to enter and leave the pet litter box. The permeable layer is strong enough to withstand pet usage without spilling urine absorbers present within the urine absorption sheet.

The collapsible pet litter pan with urine absorption sheet has very small sidewall height so that even the smallest pets can get in and get out. The pet litter pan has a plurality of rubberized feet to prevent slippage of the pan on a floor as the pet uses the pet litter apparatus. Since the urine is completely contained within the enclosed urine absorption sheet, there is no possibility of pet litter spillage. The plastic surface of the collapsible pet litter pan prevents any odor retention and a sanitary condition is maintained by simply peeling away and discarding a used urine absorption sheet and replacing it with a new one.

The tray is foldable so that it collapses to a size small enough to be included within a manufactured package of pads, which are appointed for disposition within the tray structure. It is a lightweight, small-dimensioned package composed of a thin polymeric surface material that does not rust and can be vacuum formed or injection molded at a very low cost. Accordingly, the tray can be readily disposed of and a new tray packaged with each new supply of pads. Unlike prior art trays, the lightweight, collapsible tray of the present invention takes up considerably less space on a store shelf. Its miniature size, when collapsed, facilitates placement thereof within a shopping cart, and even within a shopping bag. Removal of the absorbent pads is readily facilitated through use of a weak bonding adhesive that allows the pads to be easily peeled off the tray without extensively jarring the waste thereon. Disposal of the tray and absorbent pads is readily accomplished without the mess associated with migration of used pet litter, including irritating dust and spores.

BRIEF DESCRIPTION OF THE DRAWING

The invention will be more fully understood and further advantages will become apparent when reference is had to the following detailed description of the preferred embodiments of the invention and the accompanying drawings, in which:

FIG. 6b is a cross-sectional view of the urine absorption sheet shown in FIG. 6a;

FIG. 7 is a top planer view of another embodiment of the urine absorption sheet, wherein the adhesive coatings a re-adherable surface designed for temporarily attaching the urine absorption sheets in a stacked relation to yield a replacement sheet stack so that each of the sheets are appointed to be removed from the replacement sheet stack and temporarily adhered to the litter pan until soiled and removed therefrom;

FIG. 8b is a cross-sectional view of the urine absorption sheet shown in FIG. 8a.

DETAILED DESCRIPTION OF THE INVENTION

The compact, foldable animal litter pan with disposable waste collection sheets having an adhesive coating of the present invention includes an animal litter pan that is easily folded to a small dimension for easy packaging, transportation, storage and use. The litter pan has a polymeric surface that prevents soaking of urine. Thus the litter pan may be integrally molded from a polymeric material using known processes such as vacuum pressing, injection molding and the like. Alternatively, the litter pan may be made from cardboard or Kraft paper and bonded to a polymeric sheet. The polymer surface that resists urine soaking is typically polyethylene, polypropylene or polyvinylchloride. The pan may have many fold lines, and preferably has three fold lines. The hinges at the fold lines are, optionally, strengthened by use of adhesive tapes, which also function to provide animal urine leak resistance. When the collapsed animal litter pan is expanded at the hinges, it has two sides, one side is designed to contact the floor, while the opposite side receives a urine absorption sheet having an adhesive coating. The floor contacting surface is provided with rubberized pads to generate friction between the animal litter pan and the floor. This friction prevents the displacement of the litter pan when the animal enters the pan or exits from it.

The side of the animal liter pan that receives the urine absorption sheet has sidewalls. These sidewalls constrain the movement of the urine absorption sheet. The height of the sidewalls above the floor of the litter pan is generally small, typically in the range of 0.25 to 0.375 inches. The urine absorption sheet is a three layer structure with a liquid impervious bottom layer, a urine absorption layer positioned above the impervious layer and a top porous liquid permeable layer. The top layer and bottom layer are bonded to each other, thereby constraining the urine absorption layer. The bottom layer is made from a polymeric sheet such as polyethylene, polypropylene or polyvinyl chloride sheet. An adhesive coating is applied to the bottom layer of the urine absorption sheet. This coating may be applied to substantially the entire bottom layer, or the outer borders of the bottom layer, or just a portion of the bottom layer to stabilize the sheet when in use.

Since there is no loose cat litter in this collapsible animal litter pan, there is no possibility of the spilling of cat litter and the sidewalls of the animal litter pan can be exceedingly small while nevertheless functioning to locate and stabilize the urine absorption sheet. Due to the reduced height of the litter pan sidewalls, even small animals can enter and exit the litter pan without difficulty. Shifting of the sheet from the animal's contact is mitigated due to the application of the adhesive coating on the bottom layer of the sheet.

Figure 1:
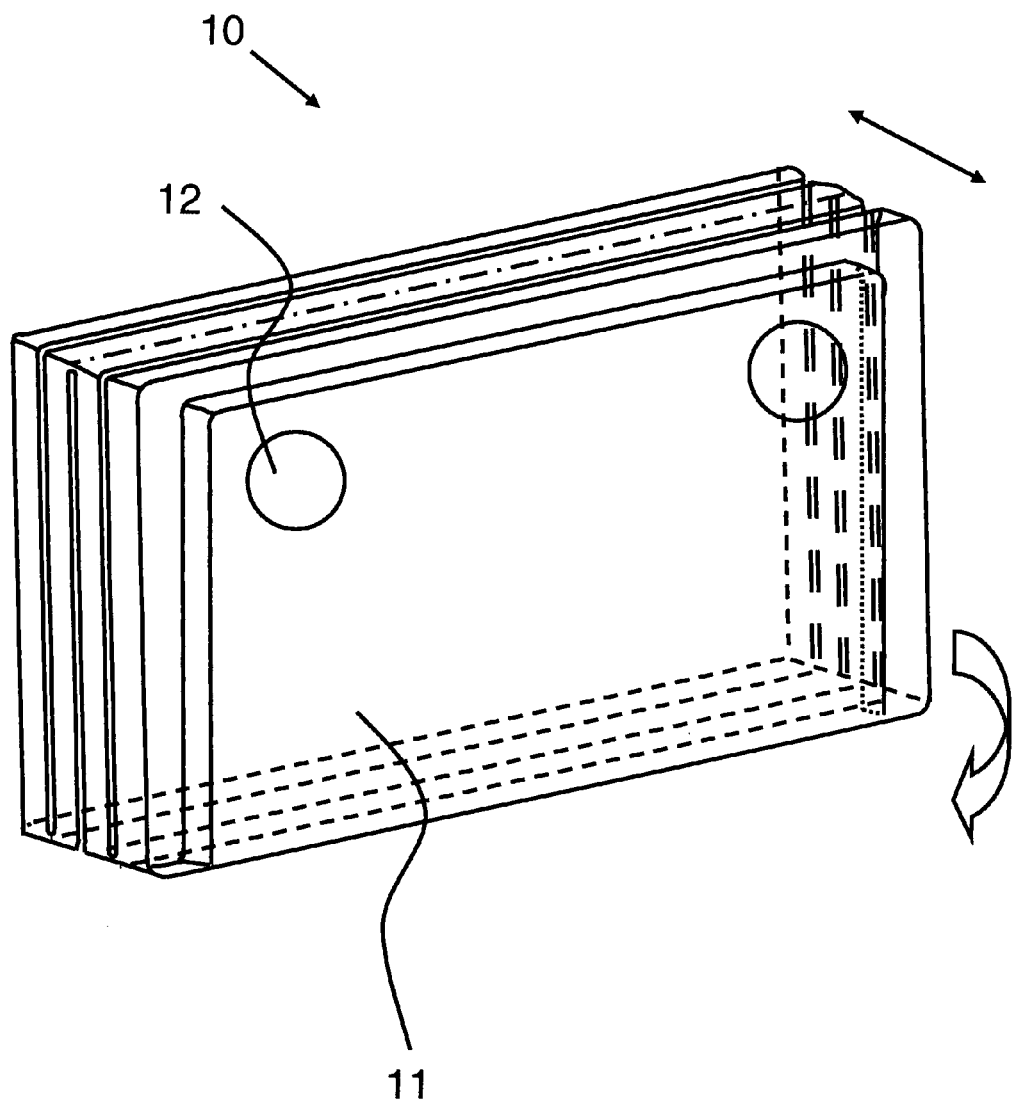
FIG. 1 is a schematic view of the pet litter tray with polymer surface in the collapsed condition.
Figure 5:
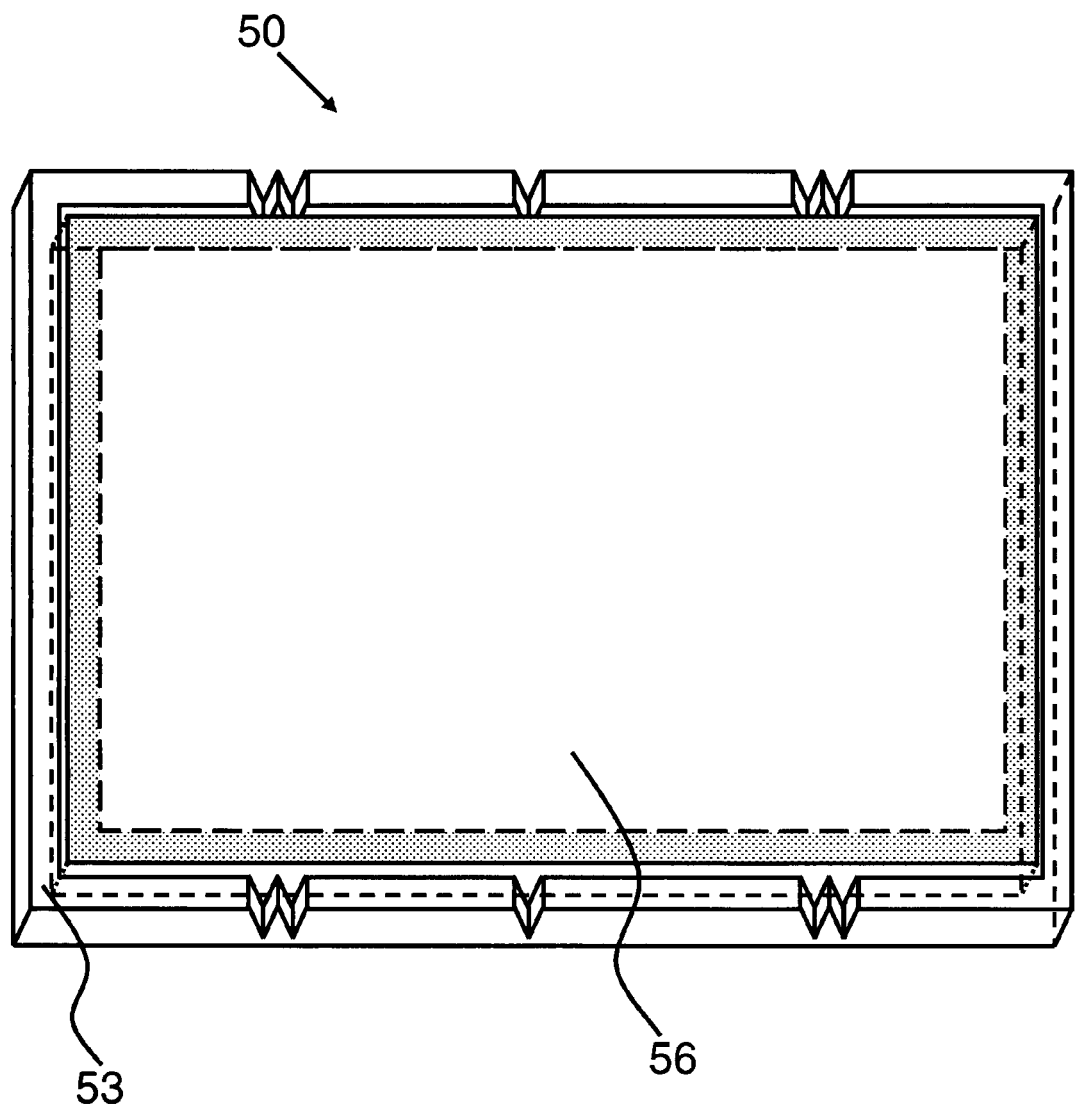
FIG. 5 is a plane view of the urine absorption sheet-receiving side of the polymer surface pet litter tray in the expanded condition, having the urine absorption sheet inserted within the sidewalls.

FIG. 1 illustrates generally at 10 a schematic view of the animal litter pan in the collapsed condition. The animal litter pan has a polymeric surface 11 that is immune to soaking by pet urine. The floor contacting surface of the animal litter pan has rubberized footings 12 to increase friction with the floor so that the animal litter pan does not become displaced when the animal uses the litter pan. The dimension of this collapsed animal litter pan is matched with that of a folded urine absorption sheet so that a plurality of urine absorption sheets may be packaged with the collapsed animal litter pan. The consumer opens the package and expands the collapsed litter plan and inserts one of the urine absorption sheets into the side opposite to the floor contacting surface which has the rubber footings as illustrated in FIGS. 2, 3 and 5.

Figure 2:
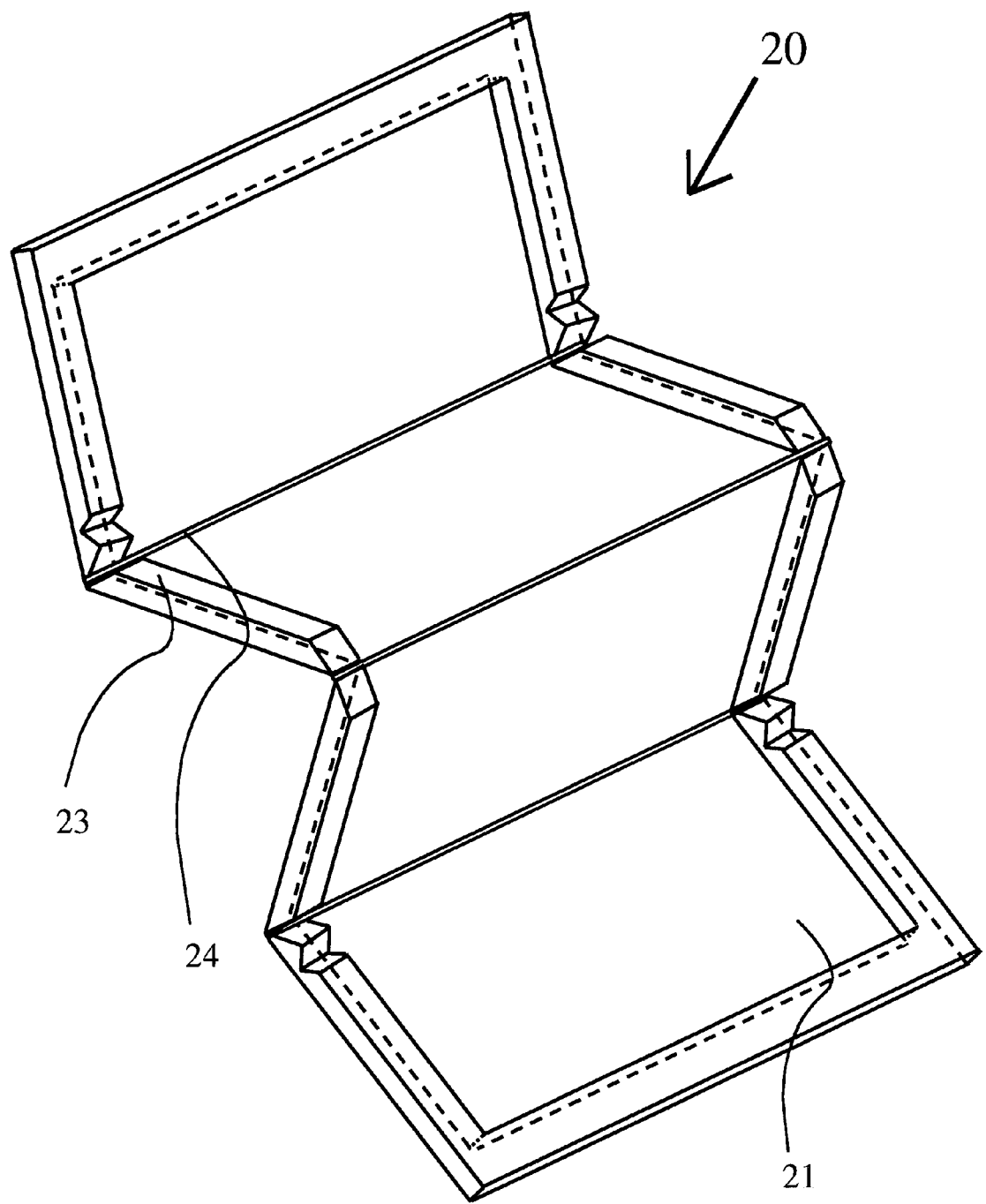
FIG. 2 is a schematic view depicting the pet litter tray with polymer surface in the partially expanded condition.

FIG. 2 illustrates generally at 20 a schematic view of the collapsed animal litter pan as it is being expanded. The floor contacting surface of the animal litter pan with rubber footings is now in contact with the floor and therefore invisible in this photograph. The polymeric surface that receives the urine absorption sheet is shown at 21. This polymeric surface 21 is such that the adhesive coating of the urine absorption sheet (shown in later figures) temporarily bonds thereto in a manner that is secure enough to mitigate shifting of the sheet, while week enough to allow the sheet to be peeled from the polymeric surface 21 with minimal effort and without disturbing the waste thereon. There are three collapsing folds in the animal litter pan and one of the folds is shown at 24. The litter pan has sidewalls at 23 which are raised at a small height above the floor of the litter plan, shown at 21. This height is typically small, in the range of 0.25 to 0.375 inches, since the shallow sidewalls are adequate to accommodate and stabilize the urine absorption sheet and, unlike conventional litter pans, are not required to prevent spillage of pet litter.

Figure 3:
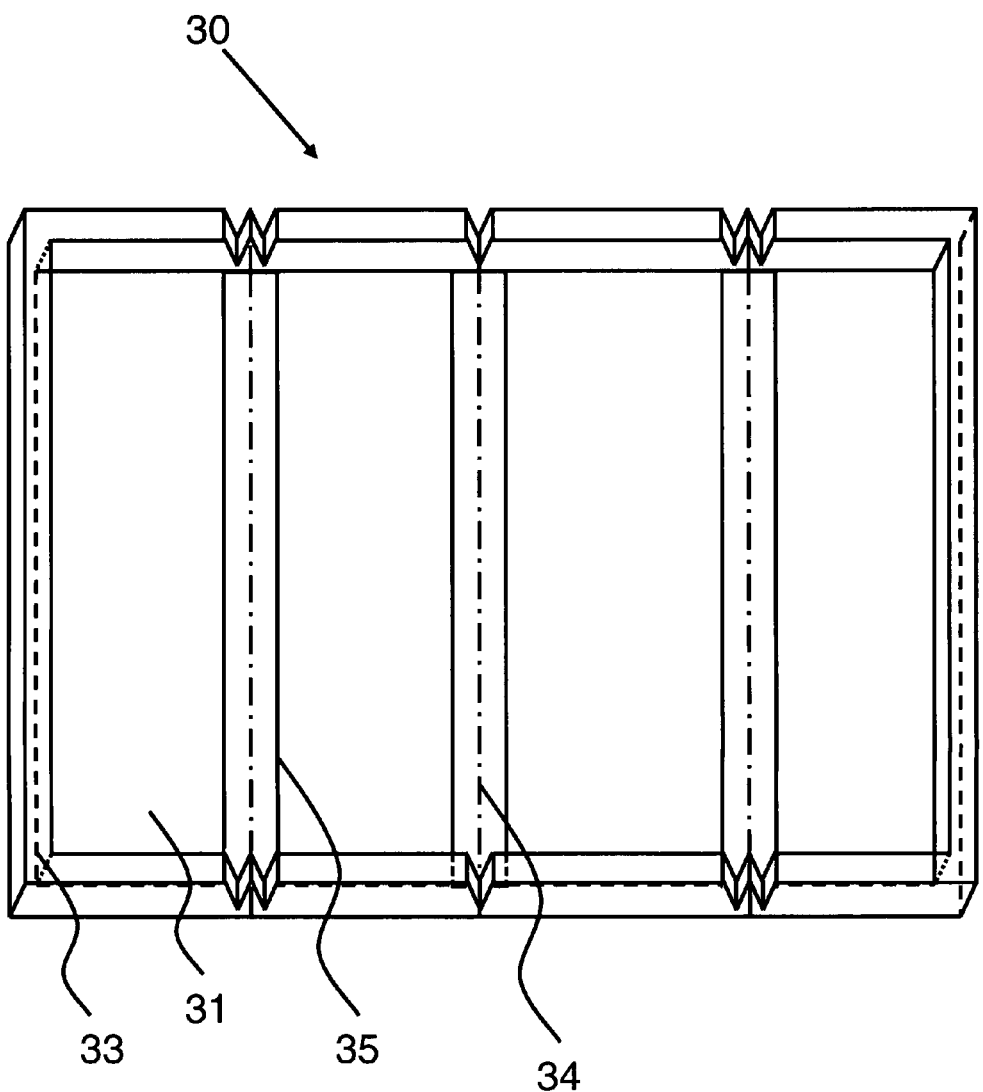
FIG. 3 is a plane view of the urine absorption sheet-receiving side of the polymer surface pet litter tray in the expanded condition.

FIG. 3 illustrates generally at 30 a plane view of the animal litter tray in the expanded condition, showing the polymeric surface 31 that receives the urine absorption sheet. This polymer surface 31 is immune to soaking by animal urine. There are three fold lines, one of which is shown at 34. An adhesive tape 35 covering the fold line 34 increases the fold hinge stability and reduces the possibility of any animal urine leakage. The sidewalls of the animal litter pan are shown at 33.

Figure 4:
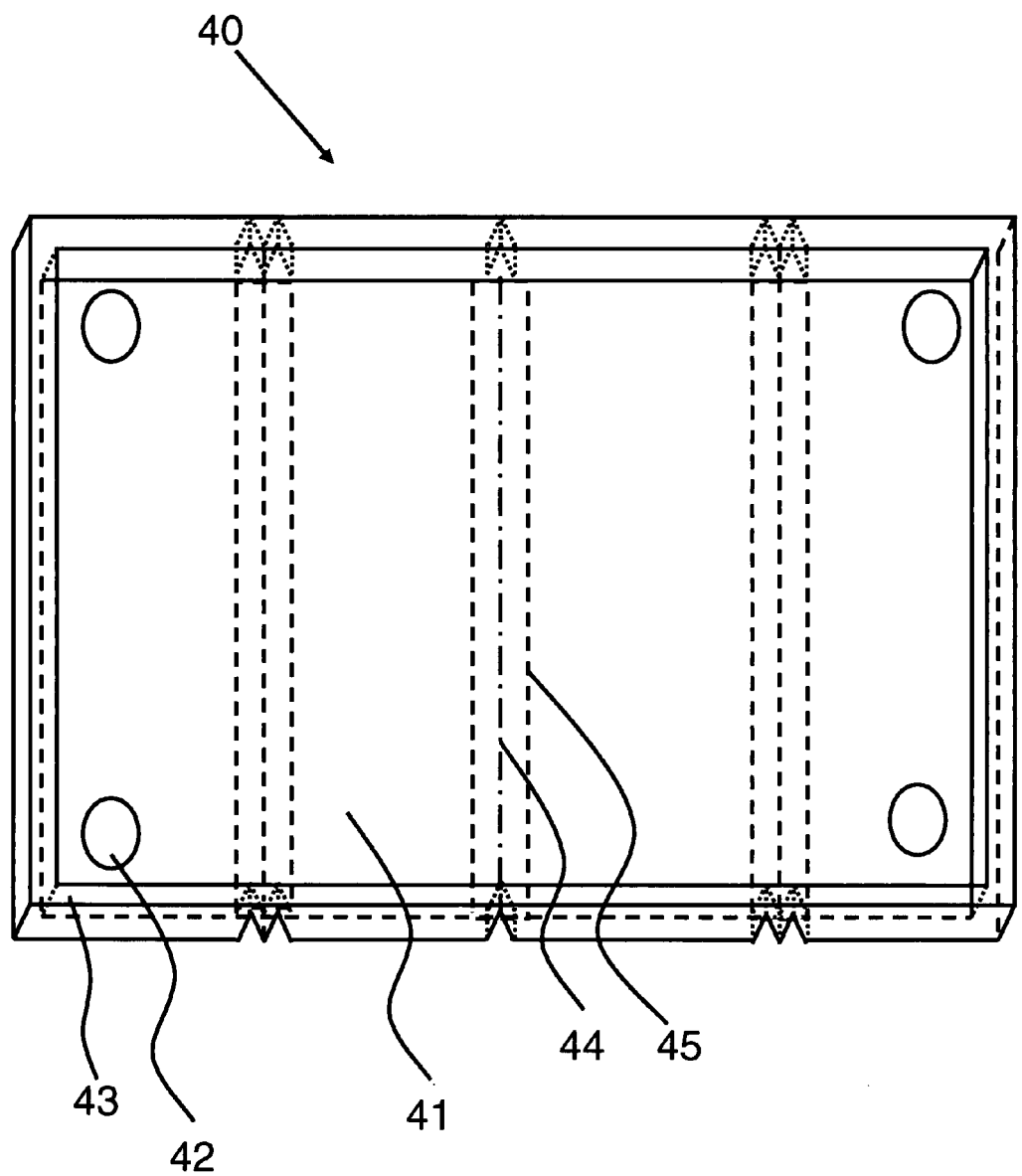
FIG. 4 is a plane view of the floor contacting reverse side of the polymer surface pet litter tray, showing rubberized feet and adhesive tape at fold lines.

FIG. 4 shows generally at 40 a plane view of the floor contacting surface of the animal litter pan in the expanded condition. The polymeric surface of the animal litter pan is shown at 41. In this photograph, four rubberized friction generating pads are shown and one rubberized pad is indicated at 42. There are three fold lines, one of which indicated at 44. The adhesive tape that reinforces the hinge and reduces the possibility of animal urine leakage is shown at 45. A plurality of cover caps (not shown) are optionally provided with each pad package. The cover caps are channel-shaped structures designed to fit over and secure the side walls 43 at portions thereof near each hinge. Each of the cover caps fits over the portion of side walls 43 near each hinge to maintain a consistent sidewall height in the vicinity of the hinge. Alternatively, each of the cover caps has a triangulated configuration adapted to mate with the triangulated shape of the sidewall 43 at each hinged portion thereof.

FIG. 5 shows generally at 50 a plane view of the expanded animal litter pan with urine absorption sheet 56 in place between the sidewalls 53. The polymeric surface that is immune to urine absorption is directly underneath the urine absorption sheet.

Figure 6A:
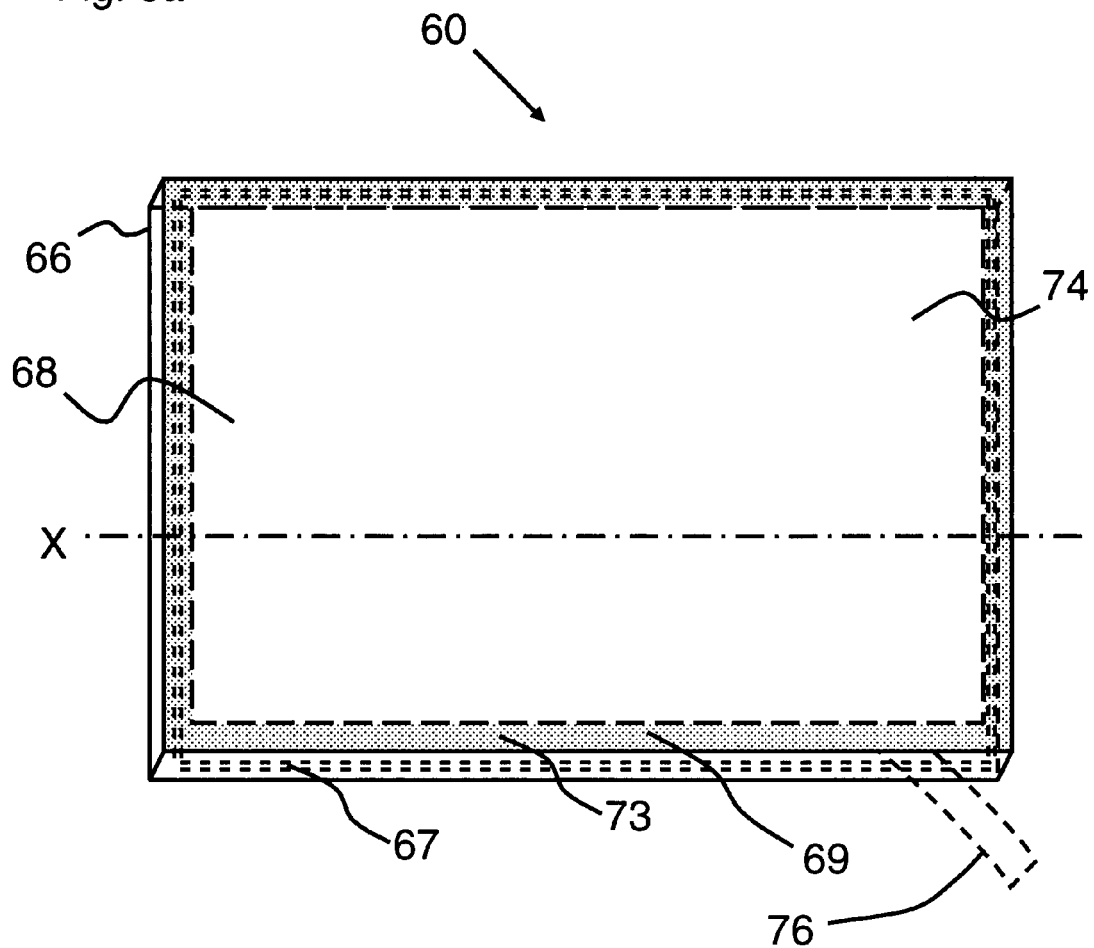
FIG. 6a is a top planer view of another embodiment of the urine absorption sheet, wherein the adhesive coating is applied to the outer border of the bottom of the urine absorption sheet.
Figure 6B:
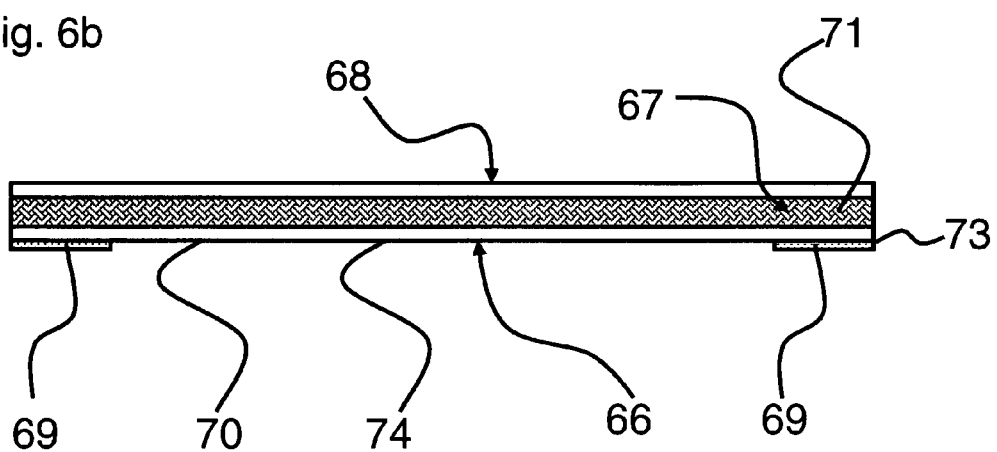

FIGS. 6a and 6b show views of an embodiment of the urine absorption sheet wherein the adhesive coating is applied to the outer border of the bottom of the urine absorption sheet. Particularly: FIG. 6a shows a top planer view of the embodiment of the urine absorption sheet, generally at 60; and FIG. 6b shows a cross-sectional view of the urine absorption sheet shown in FIG. 6a taken along line X. The urine absorption sheet 60 is a three layer structure with a liquid impervious bottom layer 66, a urine absorption layer 67 positioned above the impervious layer 66 and a top porous liquid permeable layer 68. The top layer 68 and bottom layer 66 are bonded to each other, thereby constraining the urine absorption layer 67. Bottom layer 66 is made from a polymeric sheet such as polyethylene, polypropylene or polyvinyl chloride sheet, and includes a back and face side thereof. The back side of the bottom layer 66 is appointed to engage with the polymeric surface of the litter tray, while the face side of the bottom layer 66 is appointed to engage with the urine absorption layer 67 and be bonded to the top porous liquid permeable layer 68 to substantially seal in the urine absorption layer 67.

An adhesive coating 69 is applied to the back side 70 of bottom layer 66 of the urine absorption sheet 60. Back side 70 of bottom layer 66 includes an outer perimeter or border 73 and a center 74. In this embodiment, the adhesive coating 69 is applied to outer border 73 of back side 70 of bottom layer 66. This adhesive coating 69 is preferably a low tack adhesive/week adhesive, yet is strong enough to form a bond to the polymeric surface of the litter tray so as to mitigate moving and shifting of the sheet as the animal moves to and from on the sheet or steps on the sheet to enter and exit the litter tray. For example, during manufacture of the urine absorption sheet 60 a spray adhesive may be applied to the back side 70 of the bottom layer 66, such as Super 77 Spray Adhesive from 3M, or the like. Adhesive double sided tape may be applied to the back side 70 of bottom layer 66. A peal-able covering, a removed portion of which is shown in phantom at 76, may be applied to the adhesive coating 69 before use, so that when it is time to use the sheet 60, the peal-able covering 76 is removed from the adhesive coating 69 and the sheet 60 is adhered to the polymeric surface of the litter tray for use. Preferably, the sheets 60 are sold in a folded, compact condition similar in size and shape to the folded/compact condition of the litter tray.

The urine absorption layer 67 of the sheet 60 contains absorbers 71 including cotton, cellulose fluff pulp, commuted pulp, soft wood fine chips, hydrophilic paper and combinations thereof. This urine absorption layer 67 preferably contains superabsorbing polymers such as borated polysaccharides or cross linked carboxymethylcellulose, alkali metal salts of polyacrylic acids, polyacrylamides, polyvinyl alcohol, ethylene maleic anhydride copolymers, polyvinyl ethers, hydroxypropyl cellulose, polyvinyl morpholinone, polymers and copolymers of vinyl sulfonic acid, polyacrylates, polyacrylamides, polyvinyl pyridine and the like. These superabsorbent polymers are contained within cotton or cellulose fibers. Superabsorbent polymers can typically absorb 100 times the amount of liquid compared to the weight of the superabsorpent polymer.

The top layer 68 of the urine absorption sheet 60 may be a woven or non woven fabric with a net spacing large enough to promote urine entry while being small enough to prevent penetration by the nail of the animal. The top layer fabric is strong enough to prevent being damaged when the animal uses the litter pan. Fragrant particles or compounds/odor eliminating compounds may be integrated within the urine absorption sheet 60 to eliminate or diminish odors given off by the sheet 60 after it has been soiled, yet before it is ready to be discarded. Preferably, these compounds are integrated within either top layer 68 or urine absorption layer 67 of the urine absorption sheet 60.

Animal urine is substantially entirely contained within the urine absorption sheet 60. The sheet 60 may absorb effectively several urine discharges without becoming soaked through. Feces excreted by the animal remain on the urine absorbent sheet 60. The user may choose to remove the feces and continue using the urine absorption sheet or may decide to discard the urine absorption sheet together with the feces. Due to the week adhering nature of the adhesive, the sheet is readily peeled from the litter pan with minimal effort without disturbing the waste collected thereon. A new urine absorption sheet 60 is inserted between the sidewalls of the collapsible animal litter pan and gently pressed down where the adhesive coating is applied to temporarily bond the adhesive, and visa vie the sheet, to the litter tray. Shifting of the sheet from the animal's contact is mitigated due to the application of the adhesive coating on the bottom layer of the sheet.

FIG. 7 shows a top planer view of an alternative embodiment of the urine absorption sheet, wherein the adhesive coatings a re-adherable surface designed for temporarily attaching the urine absorption sheets in a stacked relation to yield a replacement sheet stack so that each of the sheets are appointed to be removed from the replacement sheet stack and temporarily adhered to the litter pan until soiled and removed therefrom. This embodiment is shown at 700. In this embodiment, urine absorption sheets 760 are sold as a replacement stack 791. Urine absorption sheets 760 include the three layer configuration and are shown herein including the adhesive coating 769 located on border 773 of back side 770 of bottom layer 766. A corresponding top layer border 775 may be provided on top layer 768 of the urine absorption sheet 760. In this manner adhesive coating 769 is a re-adherable surface designed for temporary attachment to top layer border 775 of the subsequent sheet's 760 top layer 768.

Figure 8A:
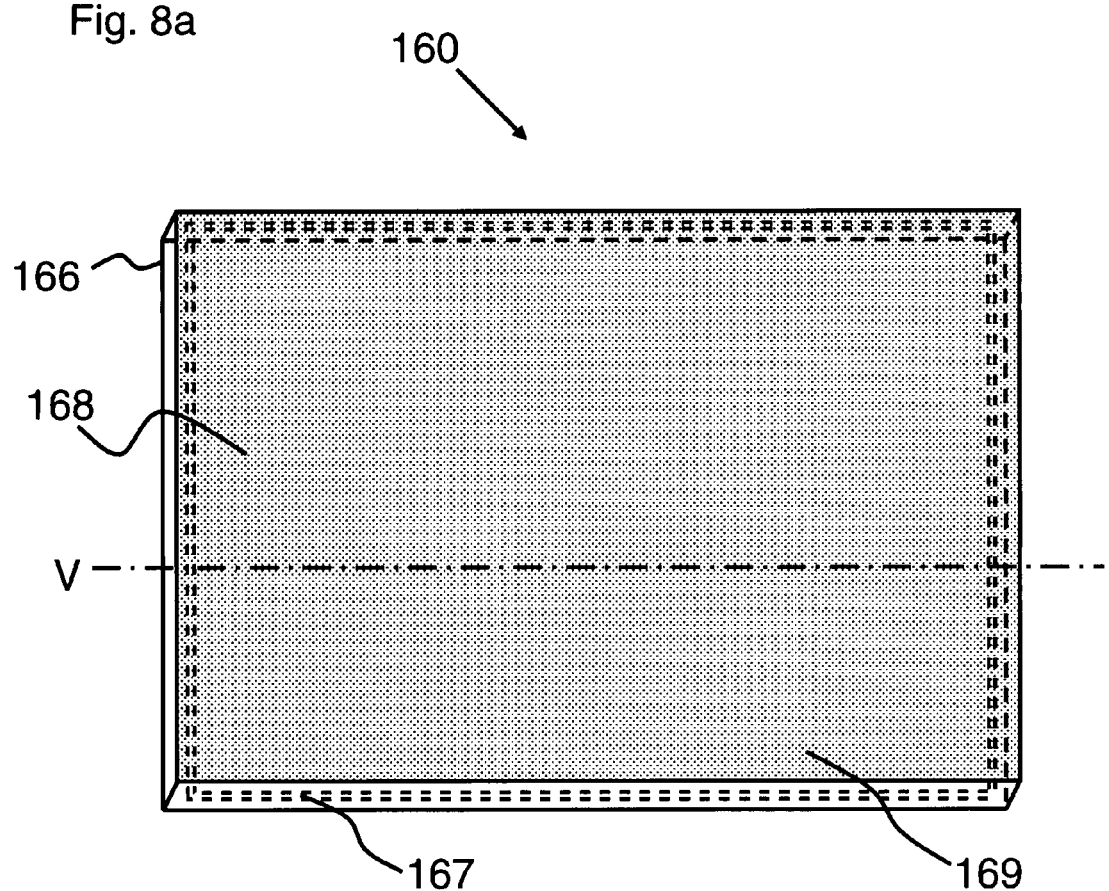
FIG. 8a is a top planer view of an embodiment of the urine absorption sheet appointed to be placed within the pet litter tray for use, wherein the adhesive coating is applied to a substantial portion of the bottom layer of the urine absorption sheet.
Figure 8B:
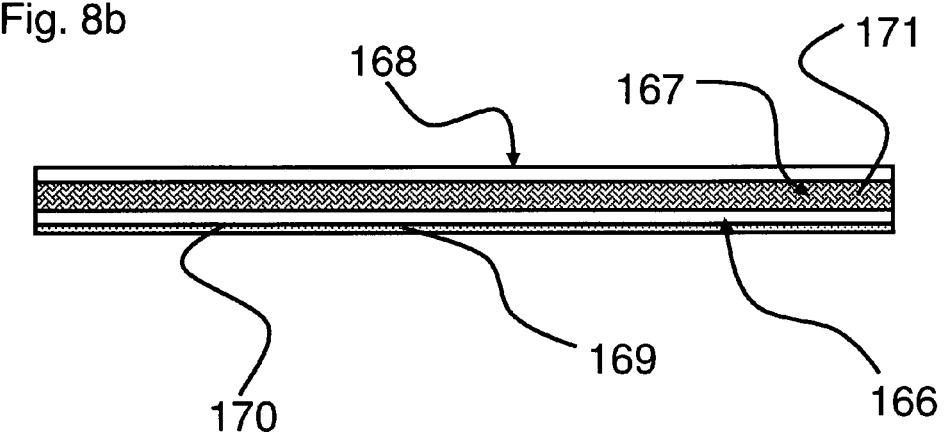

FIGS. 8a and 8b show views of an embodiment of the urine absorption sheet wherein the adhesive coating is applied to a substantial portion of the bottom layer of the urine absorption sheet. Particularly: FIG. 8a shows a top planer view of the embodiment of the urine absorption sheet having the adhesive coating applied to a substantial portion of the bottom layer of the urine absorption sheet, generally at 160; and FIG. 8b shows a cross-sectional view of the urine absorption sheet shown in FIG. 8a taken along line V. The urine absorption sheet 160 is a three layer structure with a liquid impervious bottom layer 166, a urine absorption layer 167 positioned above the impervious layer 166 and a top porous liquid permeable layer 168. The top layer 168 and bottom layer 166 are bonded to each other, thereby constraining the urine absorption layer 167. Bottom layer 166 is made from a polymeric sheet such as polyethylene, polypropylene or polyvinyl chloride sheet, and includes a back and face side thereof. The back side of the bottom layer 166 is appointed to engage with the polymeric surface of the litter tray, while the face side of the bottom layer 166 is appointed to engage with the urine absorption layer 167 and be bonded to the top porous liquid permeable layer 168 to substantially seal in the urine absorption layer 167.

An adhesive coating 169 is applied to the back side 170 of bottom layer 166 of the urine absorption sheet 160. This coating 169 may be applied to substantially the entire back side 170 of bottom layer 166 as shown, or on only a portion of back side 170 of bottom layer 166. A peal-able covering may be applied to the adhesive coating 169 during storage, so that when it is time to use the sheet 160, the peal-able covering is removed from the adhesive coating 169 and the sheet 160 is adhered to the polymeric surface of the litter tray for use.

The compact foldable animal litter pan with disposable waste collection sheets having an adhesive coating thereon comprises the following features in combination:

1) a foldable animal litter pan with a polymeric surface that is immune to animal urine soaking;
2) the foldable pan having a plurality of sections connected by hinges;
3) the hinges being reinforced with adhesive tapes proving hinge stability and reducing animal urine leakage;
4) the hinges being opened to expand the animal litter pan;
5) an expanded animal litter pan having shallow height sidewalls to localize the urine absorption sheet;
6) the expanded animal litter pan having rubberized footings on a floor contacting surface to provide friction against displacement during animal usage of the animal litter pan;
7) the urine absorption sheet comprising an impervious bottom layer, a urine absorbing layer and a top liquid permeable porous layer, the bottom layer and top layer completely constraining the urine absorbing layer;
8) the urine absorbing layer comprising superabsorbent polymers entrained within cotton or cellulose fibers;
9) an adhesive coating being applied to the bottom layer of the urine absorption sheet to provide the ability to removably secure the sheet so that it remains stationary within the litter tray;
10) the adhesive being a relatively week/low tack adhesive that is strong enough to secure the sheet in the tray in a stationary manner during use, but yet week enough so that the sheet can be readily removed by simply peeling the sheet from the litter tray with minimal disturbance of the waste collected thereon;

whereby the adhesive coating located on the bottom layer of the urine absorption sheet removably adheres to the top surface of the foldable litter pan for enhanced stability of the urine absorption sheet;

whereby animal urine is substantially completely absorbed by the urine absorption sheet and animal solid waste is retained on the sheet; and whereby a user discards a soiled urine absorption sheet and adheres a fresh urine absorption sheet onto the top surface of the foldable litter pan for future use.

Having thus described the invention in rather full detail, it will be understood that such detail need not be strictly adhered to, but that additional changes and modifications may suggest themselves to one skilled in the art. For example, the tray described herein can be provided with a handle to facilitate carrying and positioning the tray. The handle is typically connected to one of the sidewalls that extends widthwise or lengthwise of the tray when the tray is placed in the folded condition. The adhesive coating on the bottom layer of the sheet can be applied to any portion of the bottom layer to removably adhere the sheet to the litter pan. Such application of the coating can be on the borders only, on at least one of the borders, on the corners of the bottom layer of the sheet, on substantially the entire bottom layer, or the like, to secure the pad to the tray bottom. Different coating compositions and methods of application may be utilized. Such changes and modifications are intended to falling within the scope of the invention as defined by the subjoined claims

What is claimed is:

1. A collapsible animal litter pan comprising:
    a. a foldable litter pan having a polymeric surface on a bottom floor contacting surface and a top surface, said polymeric surface being immune to animal urine soaking;
    b. said foldable litter pan being provided with a plurality of expandable hinges adapted to collapse and expand said litter pan in an accordion configuration along a transverse axis, said hinges intersect said bottom floor contacting surface and said top surface of said litter pan and adjacently intersect and interrupt said side walls to form hingedly connected segments separated by fold locations flush with said bottom floor contacting surface;
    c. said bottom floor contacting surface having a plurality of friction generating rubberized pads;
    d. said top surface having shallow sidewalls for locating and stabilizing a urine absorption sheet fixedly up-right and adjacent to said top surface;
    e. a urine absorption sheet comprising a liquid impervious polymeric bottom layer, a urine absorption layer and a top liquid permeable porous layer, and said top and bottom layer being operative to constrain said urine absorption layer;
    f. an adhesive coating applied to said bottom layer of said urine absorption sheet; whereby said adhesive coating located on said bottom layer of said urine absorption sheet removably adheres to said top surface of said foldable litter pan for enhanced stability of said urine absorption sheet, animal urine is substantially completely absorbed by said urine absorption sheet, animal solid waste is retained on said sheet, and a user discards a soiled urine absorption sheet and adheres a fresh urine absorption sheet onto said top surface of said foldable litter pan for future use.

2. A collapsible animal litter pan as recited by claim 1, wherein said hinges are reinforced with adhesive tapes, providing hinge stability and animal urine leakage resistance.

3. A collapsible animal litter pan as recited by claim 1, wherein said litter pan has three hinges.

4. A collapsible animal litter pan as recited by claim 1, wherein said sidewalls have a height in the range of 0.25 to 0.375 inches.

5. A collapsible animal litter pan as recited by claim 1, wherein said folded dimension of said animal litter pan is in the range of 9 to 30 inches long by 4 to 10 inches wide.

6. A collapsible animal litter pan as recited by claim 1, wherein said folded dimension of said animal litter pan is 12 inches long by 5 inches wide.

7. A collapsible animal litter pan as recited by claim 1, wherein said litter pan is 20 inches long and 12 inches wide in the expanded condition.

8. A collapsible animal litter pan as recited by claim 1, wherein said bottom floor contacting surface has four rubberized pads.

9. A collapsible animal litter pan as recited by claim 1, wherein said urine absorption layer is is selected from the group consisting of cotton, cellulose fluff pulp, commuted pulp, soft wood fine chips, hydrophilic paper and combinations thereof.

10. A collapsible animal litter pan as recited by claim 9, wherein said absorption layer additionally includes superabsorbent polymer.

11. A collapsible animal litter pan as recited by claim 10, wherein said superabsorbent polymer is selected from the group consisting of borated polysaccharides, cross linked carboxymethylcellulose, alkali metal salts of polyacrylic acids, polyacrylamides, polyvinyl alcohol, ethylene maleic anhydride copolymers, polyvinyl ethers, hydroxypropyl cellulose, polyvinyl morpholinone, polymers and copolymers of vinyl sulfonic acid, polyacrylates, polyacrylamides, polyvinyl pyridine and combinations thereof.

12. A collapsible animal litter pan as recited by claim 1, wherein said bottom layer of said urine absorption sheet comprises an outer border and a center, wherein said adhesive coating is applied to said outer border of said bottom layer.

13. A collapsible animal litter pan as recited by claim 1, wherein said bottom layer is substantially coated with an adhesive backing.

14. A collapsible animal litter pan as recited by claim 1, wherein said adhesive coating is a low-tack adhesive that enables said urine absorption sheet to be easily attached and removed from said top surface of said foldable litter pan.

15. A collapsible animal litter pan as recited by claim 14, wherein said adhesive coating is a re-adherable surface designed for temporarily attaching said urine absorption sheet in a stacked relation to yield a replacement sheet stack so that each of said sheet is appointed to be removed from said replacement sheet stack and temporarily adhered to said litter pan until soiled and removed therefrom.

16. A collapsible animal litter pan as recited by claim 1, wherein said urine absorption sheet comprises a fragrant compound and odor eliminating compound integrated therein.

17. A litter pan assembly comprising:
   a. a urine absorption sheet having a liquid impervious polymeric bottom layer, a urine absorption layer and a top liquid permeable porous layer, and said top and bottom layer being bonded to one another and being operative to constrain said urine absorption layer; and
   b. an adhesive coating applied to said bottom layer of said urine absorption sheet;
   c. a foldable litter pan;
   d. said foldable litter pan being provided with a plurality of expandable hinges adapted to collapse and expand said litter pan in an accordion configuration along a transverse axis, said hinges intersect said bottom floor contacting surface and said top surface of said litter pan and adjacently intersect and interrupt said side walls to form hingedly connected segments separated by fold locations flush with said bottom floor contacting surface;
   whereby said adhesive coating located on said bottom layer of said urine absorption sheet removably adheres to said litter pan;
   whereby animal urine is substantially completely absorbed by said urine absorption sheet, animal solid waste is retained on said sheet; and
   whereby and a user discards a soiled urine absorption sheet and adheres a fresh urine absorption sheet onto said litter pan for future use.

18. A litter pan assembly as recited by claim 17, wherein said bottom layer of said urine absorption sheet comprises an outer border and a center, wherein said adhesive coating is applied to said outer border of said bottom layer.

19. A litter pan assembly as recited by claim 17, wherein said bottom layer is substantially coated with said adhesive backing.

20. A litter pan assembly as recited by claim 17, wherein said adhesive coating is a low-tack adhesive that enables said urine absorption sheet to be easily attached and removed from said top surface of said foldable litter pan.

21. A litter pan assembly comprising:
   a. a plurality of urine absorption sheets, each said sheet comprising a liquid impervious polymeric bottom layer, a urine absorption layer and a top liquid permeable porous layer, and said top and bottom layer being bonded to one another and being operative to constrain said urine absorption layer;
   b. an adhesive coating applied to said bottom layer of each of said urine absorption sheets; and
   c. said adhesive coating being a re-adherable surface designed for temporarily attaching said urine absorption sheets in a stacked relation to yield a replacement sheet stack;
   d. a foldable litter pan;
   e. said foldable litter pan being provided with a plurality of expandable hinges adapted to collapse and expand said litter pan in an accordion configuration along a transverse axis, said hinges intersect said bottom floor contacting surface and said top surface of said litter pan and adjacently intersect and interrupt said side walls to form hingedly connected segments separated by fold locations flush with said bottom floor contacting surface;
   whereby each of said sheets are appointed to successively be removed from said replacement sheet stack and temporarily re-adhered to said litter pan until soiled and removed therefrom, upon which time a fresh urine absorption sheet is successively removed from said replacement sheet stack and temporarily re-adhered to said litter pan until, and successive replacement continues until said replacement sheet stack is exhausted.

* * * * *